Sept. 5, 1933.  L. L. GAGNON  1,925,588
EYE PROTECTOR
Filed Jan. 20, 1930
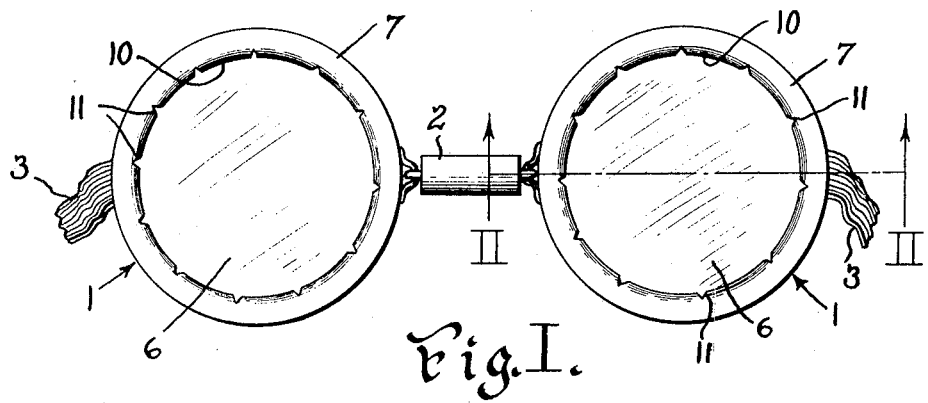
Fig. I.
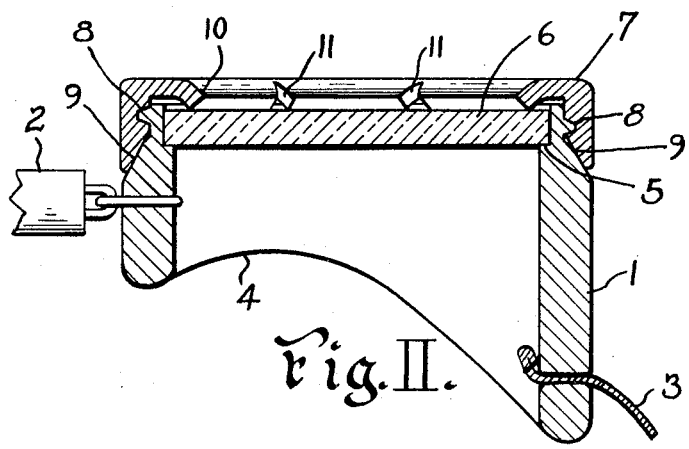
Fig. II.
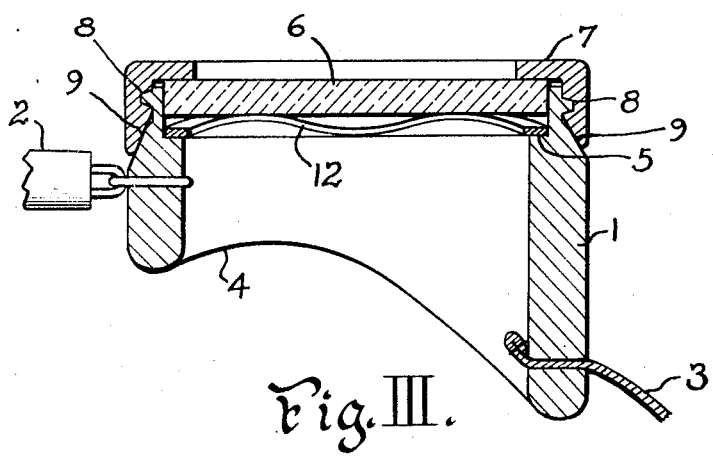
Fig. III.
Louis L. Gagnon.
INVENTOR
BY Harry H. Styll.
ATTORNEY Patented Sept. 5, 1933

1,925,588

UNITED STATES PATENT OFFICE 1,925,588

EYE PROTECTOR

Louis L. Gagnon, Southbridge, Mass., assignor to American Optical Company, Southbridge, Mass., a voluntary association of Massachusetts Application January 20, 1930. Serial No. 422,055

5 Claims. (Cl. 88—47)

This invention relates to new and useful improvements in eye protectors, and has particular reference to improved lens retaining means for holding lenses in the eyecups of goggles.

The principal object of the invention is to provide improved means for holding the lenses in the eyecups of goggles wherein they may be quickly and easily interchanged or replaced.

Another object of the invention is to provide improved means for holding the lens retaining means on the eyecup of goggles.

Another object of the invention is to provide rigid means for holding the lenses in goggles, regardless of thickness of lens.

Another object of the invention is to provide friction lock means for securing the lens retaining means on the eyecup of goggle.

Another object of the invention is to provide improved means for taking up the wear and loose play during the continued use of the lens retaining means.

Another object of the invention is to provide a simple, efficient, and durable goggle construction.

Other objects and advantages of the invention will become apparent from the following description taken in connection with the accompanying drawing, and it will be apparent that many changes may be made in the details of construction and arrangement of parts without departing from the spirit of the invention as expressed in the accompanying claims. I, therefore, do not wish to be limited to the exact details shown and described, as the preferred forms only have been shown by way of illustration.

In commercial use of goggles, whether it be in factory or individual use, there has constantly been a demand for a goggle in which the eyecups are provided with means for removably securing the lenses therein. This need has arisen from the fact that some manufacturers desire to replace the lenses usually purchased in goggles, with lenses having certain properties particularly applicable for their industry, or else the manufacturers have desired to have the lenses removable, due to the fact that frequently the original lenses of the goggles become broken or marred by flying chips, or the like, and must be replaced by new lenses. In the individual use of goggles, there is often a desire on the part of the user to insert a lens into the goggles which eliminates certain rays of light, as for example, in arc welding, or at other times, the user desires to replace the original lenses obtained in the goggles by lenses ground to a prescription to correct his vision.

Prior to my invention, therefore, there have constantly been attempts to provide eyecups in which lenses could be removably clamped, such that there is today, a number of goggles constructed with this aim in view. Insofar as I am aware, however, practically all of the structures embodied in goggles in use in the present day, include either complicated means for retaining the lenses, or else clamping means which are substantially insecure and which frequently become worn during continued use and permit the lens retaining means to fall off, allowing the dropping and subsequent breaking of lenses.

It, therefore, becomes a most important object of my invention to provide a simple, economical, and efficient means for securing the lens retaining means on the eyecups of goggles, said means to be positive in its operation, and to firmly secure the lenses from displacement or loss.

Referring to the drawing:

Fig. I is a front elevation of a pair of goggles embodying the invention.

Fig. II is an enlarged section on the line II—II of Fig. I.

Fig. III is a view similar to Fig. II, illustrating a slight modification.

Referring more particularly to the drawing wherein like characters of reference indicate like parts throughout, the device embodying the invention, comprises a pair of eyecups 1, connected centrally by a bridge member 2, and having a head engaging band 3. The eyecups 1, of my improved goggle comprise substantially cylindrical members, having one edge curved at 4 to conform to the contour of the face of the wearer, and having the opposite edge shouldered at 5 for the reception of a lens 6. The lens 6 is held in the eyecup 1 by a lens retaining ring 7 which is threaded at 8 to the reduced threaded portion of the eyecup 1. The lens retaining ring 7 and the eyecup 1 are provided with oppositely tapered binding faces 9 by means of which the lens retaining ring is rigidly secured to the eyecup 1, and prevented from backing off and beoming loose.

The lens retaining ring 7 as shown in Fig. II is provided with a turned in flange portion 10 which is slotted at 11 to permit it to flex outwardly when the flange 10 is forced into engagement with the lens 6, to secure the lens in the goggle. This turned in edge 10 is adapted to adjust itself to lenses of various thicknesses, and also exerts a slight pressure on the lens during the use of the goggle, and prevents looseness and displacement thereof.

In Fig. III, I have shown a slight modification wherein the lens 6 is pressed outwardly by a spring member 12. The spring member 12 is employed to permit the use of lenses of varying thicknesses, and also tends to prevent looseness and displacement of the lens.

The outstanding feature of the invention is the tapered binding faces 9 on the eyecup 1 and the lens retaining ring 7. When the lens retaining ring 7 is threaded on the eyecup 1, the tapered faces 9 are forced into engagement with each other until a decided binding takes place. This binding action securely locks the lens retaining ring 7 to the eyecup 1 and prevents the possible backing off of the ring on the threads 8 and the consequent looseness and dropping of the lenses. The thread 8 holds the binding faces 9 in constant engagement. It is apparent, however, that when it is desired to change or replace the lenses 6 that the lens retaining ring 7 may be easily removed by exerting a slight back pressure on the ring 7 to permit the tapered face 9 to be disengaged with the tapered face on the eyecup 1 wherein the ring may be easily threaded off of the eyecup.

From the foregoing description it will be seen that I have provided an eyecup in which lenses may be removably clamped, and yet in which the accidental displacement or loosening of the lenses is entirely eliminated. It will further be seen that I have provided lens clamping means which is simple in construction, will therefore be cheap to manufacture, and efficient in every way for the purposes specified.

Having described my invention, I claim:

1. In a device of the character described, a substantially annular eyecup having a lens shelf in the interior portion and a cap retaining section on the outer surface adjacent the lens end thereof, said retaining section comprising a relatively short threaded portion and a plain tapered portion extending outwardly from the threaded portion, and a cap member adapted to fit over the lens end of the eyecup, said cap being substantially annular in form and having on its inner surface threaded and tapered portions adapted to engage the corresponding portions of the eyecup, said tapered portions being adapted for interengagement after the threaded portions have engaged and being forced into frictional binding engagement with each other to provide a wedge action in locking the cap on the eyecup and preventing it backing off on the threads, said cap being removable from the eyecup in substantially one complete revolution thereof.

2. In a device of the character described, a substantially annular eyecup having a lens shelf in the interior portion and a cap retaining section on the outer surface adjacent the lens end thereof, said retaining section comprising a threaded portion and a plain tapered portion extending outwardly from the threaded portion, and a cap member adapted to fit over the lens end of the eyecup, said cap being substantially annular in form and having on its inner surface threaded and tapered portions adapted to engage the corresponding portions of the eyecup, said tapered portions being adapted for interengagement after the threaded portions have engaged each other to provide a wedge action in locking the cap on the eyecup and preventing it backing off on the threads, and a plurality of separated resilient tongues on the cap adapted to engage the lens as the cap is secured in place on the eyecup.

3. In a device of the character described, a substantially annular eyecup having a lens shelf in the interior portion and a cap retaining section on the outer surface adjacent the lens end thereof, said retaining section comprising a threaded portion and a plain tapered portion extending outwardly from the threaded portion, and a cap member adapted to fit over the lens end of the eyecup, said cap being substantially annular in form and having on its inner surface threaded and tapered portions adapted to engage the corresponding portions of the eyecup, said tapered portions being adapted for interengagement after the threaded portions have engaged each other to provide a wedge action in locking the cap on the eyecup and preventing it backing off on the threads, and resilient means engaging the lens and adapted to be compressed thereon as the cap is secured in place on the eyecup.

4. In a device of the character described, an eyecup having a tapered portion and a relatively short threaded portion adjacent one end thereof, separate detachable lens retaining means having a threaded portion and a tapered portion adapted to be forced into frictionally locked relation with the tapered portion of the eyecup by the cam action of threading the retaining means on to the threaded portion of the eyecup, and resilient means for resiliently supporting a lens between the eyecup and lens retaining means, said resilient means being adapted to compensate for variances in the thickness of lenses, and to prevent possible looseness and play of the lens after the retaining means has been rigidly secured and placed on the eyecup, the angle of the tapered portions being such that they will be substantially self-retaining in frictionally locked relation with each other and thereby prevent the lens retaining means from accidentally backing off on the threads and being displaced from the eyecup during the use of the goggle.

5. In a device of the character described, an eyecup having a slightly tapered portion and a reduced relatively short threaded portion adjacent one end thereof, a lens seat adjacent the reduced threaded portion, a lens retaining member having a threaded portion and an adjacent slightly tapered portion adapted to engage the reduced threaded portion and slightly tapered portion of the eyecup to retain a lens on the lens seat and resilient means between the lens retaining means and lens seat for removing possible looseness and play of the lens on the lens seat, said slightly tapered inter-engaging portions of the retaining means and eyecup being forced into frictionally locked relation with each other by the cam action of the inter-engaging thread means.

LOUIS L. GAGNON.